(12) United States Patent
Behera et al.

(10) Patent No.: US 11,507,467 B2
(45) Date of Patent: Nov. 22, 2022

(54) METHOD AND SYSTEM FOR ASSET PROTECTION THREAT DETECTION AND MITIGATION USING INTERACTIVE GRAPHICS

(71) Applicant: EMC IP Holding Company LLC, Hopkinton, MA (US)

(72) Inventors: Amarendra Behera, Bangalore (IN);
Shelesh Chopra, Bangalore (IN);
Tushar B. Dethe, Bangalore (IN);
Gururaj Soma, Bangalore (IN);
Himanshu Arora, Bangalore (IN);
Deependra Pratap Singh, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 167 days.

(21) Appl. No.: 16/673,341

(22) Filed: Nov. 4, 2019

(65) Prior Publication Data

US 2021/0133036 A1 May 6, 2021

(51) Int. Cl.
*G06F 12/00* (2006.01)
*G06F 11/14* (2006.01)
*G06F 21/62* (2013.01)

(52) U.S. Cl.
CPC ...... *G06F 11/1451* (2013.01); *G06F 11/1461* (2013.01); *G06F 11/1464* (2013.01); *G06F 11/1469* (2013.01); *G06F 21/6218* (2013.01)

(58) Field of Classification Search
CPC ............ G06F 11/1451; G06F 11/1461; G06F 11/1464; G06F 21/6218; G06F 11/1469
See application file for complete search history.

(56) References Cited

U.S. PATENT DOCUMENTS

| 9,741,006 | B2 * | 8/2017 | Svetov | G06Q 10/08 |
|---|---|---|---|---|
| 10,216,583 | B1 * | 2/2019 | Krinke | G06F 16/184 |
| 2007/0180490 | A1 * | 8/2007 | Renzi | H04L 63/145 726/1 |
| 2007/0283017 | A1 * | 12/2007 | Anand | G06F 11/1458 709/226 |
| 2008/0052328 | A1 * | 2/2008 | Widhelm | H04L 63/1408 |
| 2016/0196513 | A1 * | 7/2016 | Mallon | G06N 7/005 705/7.28 |
| 2020/0349026 | A1 * | 11/2020 | Chopra | G06F 9/547 |
| 2021/0133037 | A1 * | 5/2021 | Behera | G06F 11/1464 |
| 2021/0133042 | A1 * | 5/2021 | Behera | G06F 11/1464 |
| 2021/0133339 | A1 * | 5/2021 | Behera | G06F 21/6218 |

\* cited by examiner

*Primary Examiner* — John A Lane
(74) *Attorney, Agent, or Firm* — Chamberlain, Hrdlicka, White, Williams & Aughtry

(57) ABSTRACT

A method and system for asset protection threat detection and mitigation using interactive graphics. Specifically, the disclosed method and system entail discerning protection vulnerabilities exhibited by assets (or databases) based on maintained backup metadata. These protection vulnerabilities may subsequently be visualized as part of a projected graphical user interface, which may not only disclose the protection vulnerabilities to a user but also may enable the user to rectify the disclosed protection vulnerabilities through on-demand asset backup operations.

18 Claims, 7 Drawing Sheets

METHOD AND SYSTEM FOR ASSET PROTECTION THREAT DETECTION AND MITIGATION USING INTERACTIVE GRAPHICS

BACKGROUND

As enterprises continue to grow, databases storing data pertinent to those enterprises also grow in number. With these virtually innumerable databases, management of the entire database population, at least with respect to safeguarding them from data loss, is becoming ever more difficult.

SUMMARY

In general, in one aspect, the invention relates to a method for mitigating asset protection threats, comprising: detecting an asset protection intent based on user interaction with a published user interface; identifying an asset to which the asset protection intent is directed; initiating, in response to the detecting the asset protection intent, a backup operation targeting the asset to obtain a backup asset; and issuing, to a backup storage system, a backup request comprising the backup asset.

In general, in one aspect, the invention relates to a non-transitory computer readable medium (CRM) comprising computer readable program code, which when executed by a computer processor, enables the computer processor to: detect an asset protection intent based on user interaction with a published user interface; identify an asset to which the asset protection intent is directed; initiate, in response to the detecting the asset protection intent, a backup operation targeting the asset to obtain a backup asset; and issue, to a backup storage system, a backup request comprising the backup asset.

Other aspects of the invention will be apparent from the following description and the appended claims.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1A-5, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to a method and system for asset protection threat detection and mitigation using interactive graphics. Specifically, one or more embodiments of the invention entail(s) discerning protection vulnerabilities exhibited by assets (or databases) based on maintained backup metadata. These protection vulnerabilities may subsequently be visualized as part of a projected graphical user interface, which may not only disclose the protection vulnerabilities to a user but also may enable the user to rectify the disclosed protection vulnerabilities through on-demand asset backup operations.

Figure 1A:
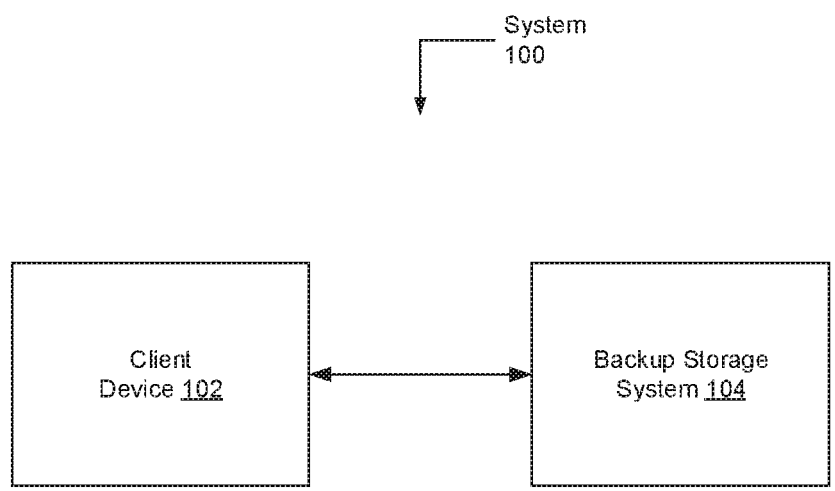
FIG. 1A shows a system in accordance with one or more embodiments of the invention.

FIG. 1A shows a system in accordance with one or more embodiments of the invention. The system (100) may include a client device (102) and a backup storage system (104). Each of these system (100) components is described below.

In one embodiment of the invention, the above-mentioned system (100) components may operatively connect to one another through a network (not shown) (e.g., a local area network (LAN), a wide area network (WAN) such as the Internet, a mobile network, any other network type, or a combination thereof). The network may be implemented using any combination of wired and/or wireless connections. Further, the network may encompass various interconnected, network-enabled components (e.g., switches, routers, gateways, etc.) that may facilitate communications between the above-mentioned system (100) components. Moreover, the above-mentioned system (100) components may communicate with one another using any combination of wired and/or wireless communication protocols.

In one embodiment of the invention, the client device (102) may represent any physical computing system designed and configured to receive, generate, process, store, and/or transmit data, as well as to provide an environment in which one or more computer programs (not shown) may execute thereon. The computer program(s) may, for example, implement large-scale and complex data processing; or implement one or more services offered locally or over the network. Further, in providing an execution environment for the computer program(s) installed thereon, the client device (102) may include and allocate various resources (e.g., computer processors, memory, storage, virtualization, network bandwidth, etc.), as needed, to the computer program(s) and the task(s) (process(es)) instantiated thereby. One of ordinary skill will appreciate that the client device (102) may perform other functionalities without departing from the scope of the invention. Examples of the client device (102) may include, but are not limited to, a desktop computer, a laptop computer, a workstation computer, a server, a mainframe, or any other computing system similar to the exemplary computing system shown in FIG. 5. Moreover, the client device (102) is described in further detail below with respect to FIG. 1B.

In one embodiment of the invention, the backup storage system (104) may represent a data backup, archiving, and/or disaster recovery storage system. To that extent, the backup storage system (104) may at least be designed and configured to: receive and store asset copies (also referred to as backup assets), respective to assets belonging to one or more services (described below) (see e.g., FIG. 1B), from the client device (102) during asset backup operations; and retrieve and restore any subset of the aforementioned asset copies onto the client device (102) during asset recovery operations. One of ordinary skill will appreciate that the backup storage system (104) may perform other functionalities without departing from the scope of the invention.

In one embodiment of the invention, the backup storage system (104) may be implemented using one or more servers (not shown). Each server may reflect a physical server, which may reside in a datacenter, or a virtual server, which may reside in a cloud computing environment. Additionally or alternatively, the backup storage system (104) may be implemented using one or more computing systems similar to the exemplary computing system shown in FIG. 5. Furthermore, the backup storage system (104) is described in further detail below with respect to FIG. 1C.

While FIG. 1A shows a configuration of components, other system (100) configurations may be used without departing from the scope of the invention. For example, the system (100) may further include one or more additional client devices (not shown) and/or one or more additional backup storage systems (not shown).

Figure 1B:
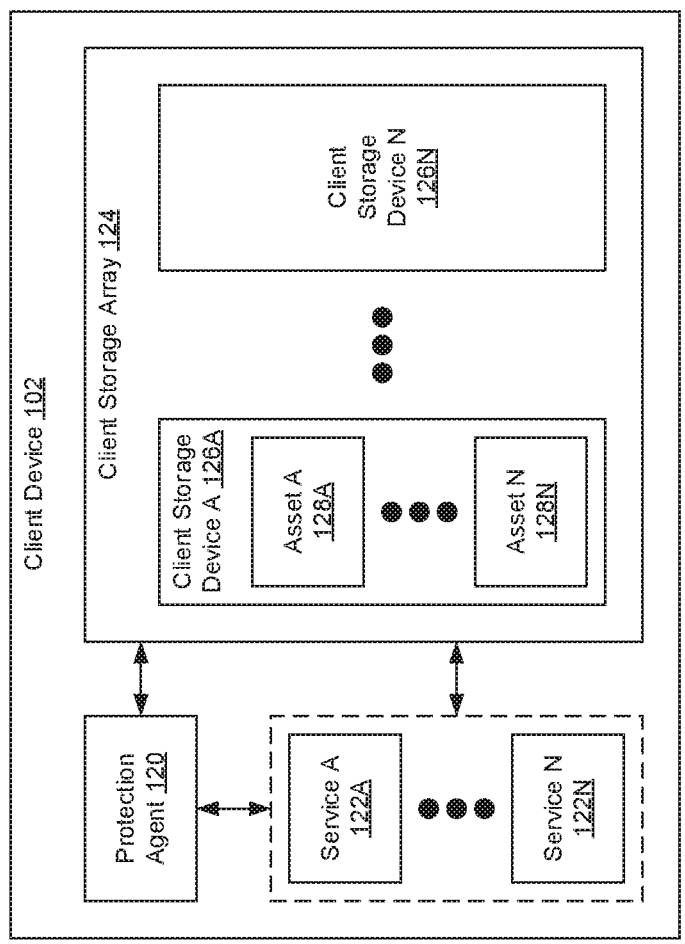
FIG. 1B shows a client device in accordance with one or more embodiments of the invention.

FIG. 1B shows a client device in accordance with one or more embodiments of the invention. The client device (102) may include a protection agent (120), one or more services (122A-122N), and a client storage array (124). Each of these client device (102) subcomponents is described below.

In one embodiment of the invention, the protection agent (120) may refer to a computer program that may execute on the underlying hardware of the client device (102). Specifically, the protection agent (120) may be responsible for detecting and facilitating the mitigation of asset protection threats. To that extent, the protection agent (120) may include functionality to perform the various steps outlined below with respect to FIGS. 3 and 4, which may be directed to publishing a user interface (exemplified in FIG. 2) and enabling users to mitigate asset protection threats using interactive graphics, respectively. One of ordinary skill will appreciate that the protection agent (120) may perform other functionalities without departing from the scope of the invention.

In one embodiment of the invention, a service (122A-122N) may represent a database management system instance (e.g., a computer program), which may execute on the underlying hardware of the client device (102) as an operating system service. Each service (122A-122N) may manage one or more databases (also referred to as assets), which may maintain both system-pertinent and user-defined information and metadata. Further, any given service (122A-122N) may include functionality to enable client device (102) users to store and query data across the asset(s) respective to the given service (122A-122N). One of ordinary skill will appreciate that a service (122A-122N) may perform other functionalities without departing from the scope of the invention.

In one embodiment of the invention, the client storage array (124) may refer to physical data storage across which various forms of data—e.g., one or more assets (128A-128N) (described below)—may be maintained. The client storage array (124) may be implemented using one or more client storage devices (126A-126N). Each client storage device (126A-126N) may encompass non-transitory computer readable storage media on which data may be stored in whole or in part, and temporarily or permanently. Further, each client storage device (126A-126N) may be designed and configured based on a common or different storage device technology—examples of which may include, but are not limited to, flash based storage devices, fibre-channel (FC) based storage devices, serial-attached small computer system interface (SCSI) (SAS) based storage devices, and serial advanced technology attachment (SATA) storage devices. Moreover, any subset or all of the client storage array (124) may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, an asset (128A-128N) may represent a database, or a logical container to and from which related data may be stored and retrieved, respectively. An asset (128A-128N) may occupy a portion of a client storage device (126A-126N) or, alternatively, may span across multiple client storage devices (126A-126N), of the client storage array (124). Furthermore, an asset (128A-128N) may refer to a composite of various database objects (not shown) including, but not limited to, one or more data files, one or more control files, and one or more redo log files.

In one embodiment of the invention, a data file may refer to a database object for storing database data. Database data may encompass computer readable content (e.g., images, text, video, audio, machine code, any other form of computer readable content, or a combination thereof). A control file may refer to a database object for storing asset (128A-128N) metadata (also referred to as database metadata). Database metadata may encompass information descriptive of the database (or asset (128A-128N)) status and structure. By way of examples, database metadata may include, but are not limited to, a database name assigned to the asset (128A-128N), the name(s) and storage location(s) of one or more data files and redo log files associated with the asset (128A-128N), a creation timestamp encoding the date and/or time marking the creation of the asset (128A-128N), a log sequence number associated with a current redo log file, etc. Moreover, a redo log file may refer to a database object for storing a history of changes made to the database data. A redo log file may include one or more redo entries (or redo records), which may include a set of change vectors. Each change vector subsequently describes or represents a modification made to a single asset (128A-128N) data block. Furthermore, a redo log file may serve to recover the asset (128A-128N) should a failover occur, or to apply recent changes to a recovered asset (128A-128N) which may have transpired during the database recovery process.

While FIG. 1B shows a configuration of components, other client device (102) configurations may be used without departing from the scope of the invention.

Figure 1C:
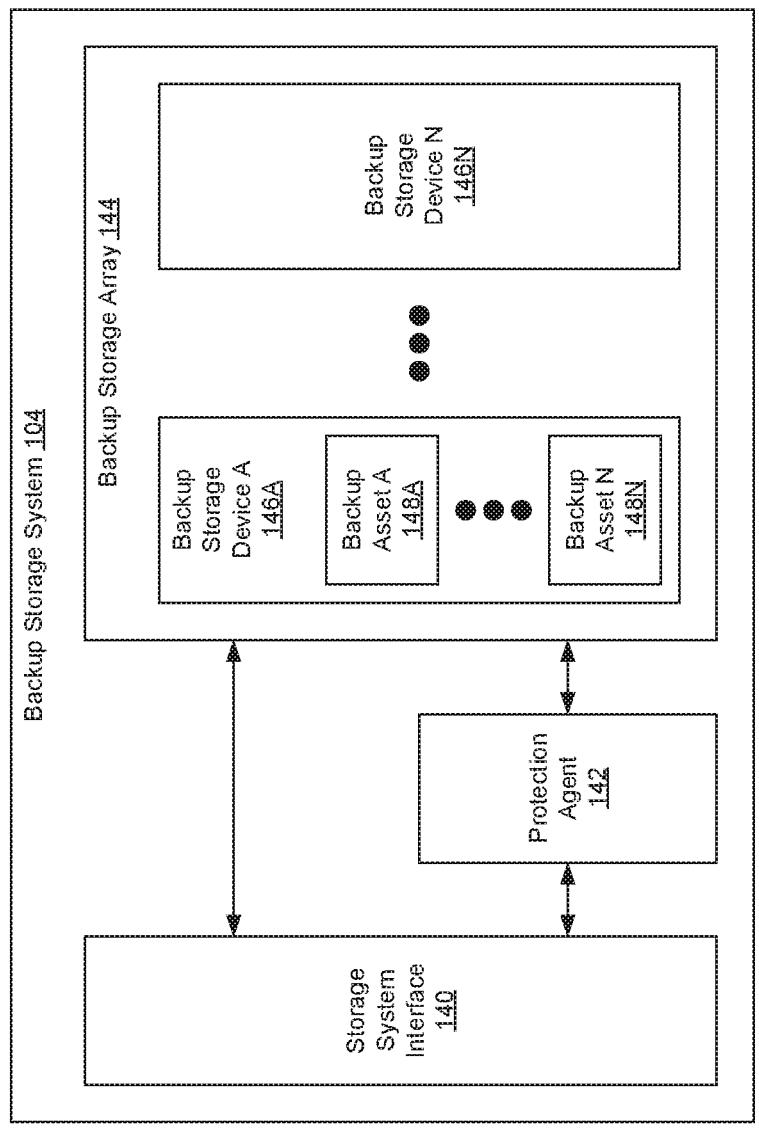
FIG. 1C shows a backup storage system in accordance with one or more embodiments of the invention.

FIG. 1C shows a backup storage system in accordance with one or more embodiments of the invention. The backup storage system (104) may include a storage system interface (140), a protection agent (142), and a backup storage array (144). Each of these backup storage system (104) subcomponents is described below.

In one embodiment of the invention, the storage system interface (140) may refer to a logical interface or interactivity protocol, which may be designed and configured to facilitate communications between the backup storage system (104) and external entities (e.g., the client device (102)), and handle queries and/or backup requests directed to the backup storage system (104). To that extent, the storage system interface (140) may include functionality to: receive queries from the client device (102); process the received queries to return backup asset metadata descriptive of one or more backup assets (described below) to the client device (102); receive backup requests from the client device (102); delegate the received backup requests to the protection agent (142) for processing; and issue acknowledgements to the client device (102) following the completed processing of the received backup requests. One of ordinary skill will appreciate that the storage system interface (140) may perform other functionalities without departing from the scope of the invention.

In one embodiment of the invention, the protection agent (142) may refer to a computer program that may execute on the underlying hardware of the backup storage system (104). Specifically, the protection agent (142) may be designed and configured to facilitate backup operations. To that extent, the protection agent (142) may include functionality to: obtain backup requests delegated from the storage system interface (140); process the obtained backup requests to store one or more backup assets (described below) in the backup storage array (144); and provide acknowledgements to the storage system interface (140) upon completing the storage of the backup asset(s). One of ordinary skill will appreciate that the protection agent (142) may perform other functionalities without departing from the scope of the invention.

In one embodiment of the invention, the backup storage array (144) may refer to physical data storage across which various forms of data—e.g., one or more backup assets (148A-148N) (described below)—may be maintained. The backup storage array (144) may be implemented using one or more backup storage devices (146A-146N). Each backup storage device (146A-146N) may encompass non-transitory computer readable storage media on which data may be stored in whole or in part, and temporarily or permanently. Further, each backup storage device (146A-146N) may be designed and configured based on a common or different storage device technology—examples of which may include, but are not limited to, flash based storage devices, fibre-channel (FC) based storage devices, serial-attached small computer system interface (SCSI) (SAS) based storage devices, and serial advanced technology attachment (SATA) storage devices. Moreover, any subset or all of the backup storage array (144) may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, an backup asset (148A-148N) may refer to one or more backup copies of a given asset (128A-128N) (see e.g., FIG. 1B). Accordingly, a backup asset (148A-148N) may similarly represent a database, or a logical container to and from which related data, or any granularity thereof, may be stored and retrieved, respectively. A backup asset (148A-148N) may occupy a portion of a backup storage device (146A-146N) or, alternatively, may span across multiple backup storage devices (146A-146N), of the backup storage array (144). Furthermore, similar to an asset (128A-127N), a backup asset (148A-148N) may refer to a composite of various database objects including, but not limited to, one or more data files, one or more control files, and one or more redo log files (all described above) (see e.g., FIG. 1B).

While FIG. 1C shows a configuration of components, other backup storage system (104) configurations may be used without departing from the scope of the invention.

Figure 2:
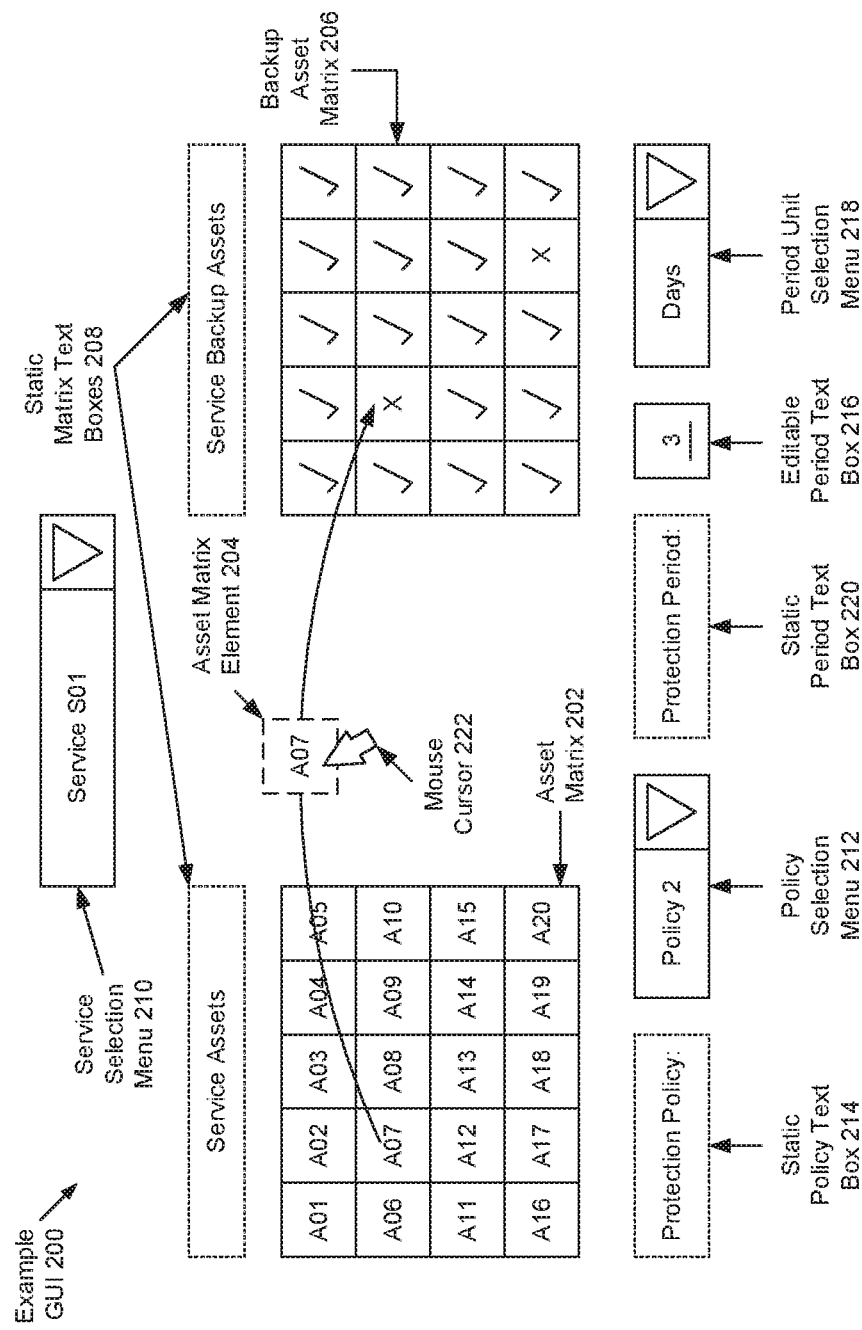
FIG. 2 shows an exemplary graphical user interface in accordance with one or more embodiments of the invention.

FIG. 2 shows an exemplary graphical user interface (GUI) in accordance with one or more embodiments of the invention. The GUI (200) may represent a non-limiting example of a user interface that may be generated and managed by the protection agent, executing on the client device (see e.g., FIG. 1B), in order to disclose detected asset protection threats and facilitate user mitigation of those asset protection threats. The GUI (200) may include various user interface objects—each of which is described below.

In one embodiment of the invention, the GUI (200) may include an asset matrix (202). The asset matrix (202) may refer to a collection of asset matrix elements (204). Each asset matrix element (204) may associate with an asset, of a set of assets, belonging to a given live service. Accordingly, a given asset matrix element (204) may exhibit (or disclose), to the user, an asset name uniquely identifying the asset with which the given asset matrix element (204) may be associated.

In one embodiment of the invention, the GUI (200) may include a backup asset matrix (206). The backup asset matrix (206) may refer to a collection of backup asset matrix elements (not annotated). Each backup asset matrix element may associate with a backup asset, of a set of backup assets, belonging to a given live service. The set of backup assets may map to the set of assets, respectively. Accordingly, a cardinality of the collection of backup asset matrix elements may match a cardinality of the collection of asset matrix elements (204). Furthermore, each backup asset matrix element may exhibit (or disclose), to the user, a visual indicator that reflects whether an asset protection threat has been detected for a backup asset with which the backup asset matrix element may be associated. For example, as portrayed through the GUI (200), backup assets, for which an asset protection threat have been discovered, may be shown as having an "X" marker contained inside their respective backup asset matrix elements. On the other hand, backup assets, for which an asset protection threat have not been discovered, may alternatively be shown as having a check mark contained inside their respective backup asset matrix elements.

In one embodiment of the invention, the GUI (200) may include a pair of static matrix text boxes (208). Each static matrix text box (208) may represent a static text field, which contains and displays a pre-determined character string (e.g., a sequence of letters, numbers, symbols, or any combination thereof). As portrayed in the GUI (200), a first static matrix text box (208) may be positioned above the asset matrix (202) and, accordingly, may contain a first character string (e.g., "Service Assets") disclosing that which the collection of asset matrix elements (204) may represent. Meanwhile, a second static matrix text box (208) may be positioned above the backup asset matrix (206) and, accordingly, may contain a second character string (e.g., "Service Backup Assets") disclosing that which the collection of backup asset matrix elements (not annotated) may represent. Moreover, a user may not interact with the pair of static matrix text boxes (208).

In one embodiment of the invention, the GUI (200) may include a service selection menu (210). The service selection menu (210) may represent a drop-down menu. When interacted with by a user, the service selection menu (210) may expand to display a list of service names, which may map to a list of live services, respectively, that have been identified to be executing on the client device. Further, following a user selection from the aforementioned list of service names, the service selection menu (210) may collapse, thereby displaying only a selected service name (e.g., "Service S01") mapped to a given live service. Moreover, each time a different user selection transpires from the list of service names, at least a subset of the various user interface objects (e.g., the asset matrix (202) and the backup asset matrix (206)) may change to disclose information respective to a given live service mapped to the selected service name.

In one embodiment of the invention, the GUI (200) may include a policy selection menu (212). The policy selection menu (212) may represent a drop-down menu. When interacted with by a user, the policy selection menu (212) may expand to display a list of policy names, which may map to a list of protection policies, respectively, that may be applied on the backup storage system. Further, following a user selection from the aforementioned list of policy names, the policy selection menu (212) may collapse, thereby displaying only a selected policy name ("Policy 2") mapped to a given protection policy.

In one embodiment of the invention, the GUI (200) may include a static policy text box (214). The static policy text box (214) may represent a static text field, which contains and displays a pre-determined character string (e.g., a sequence of letters, numbers, symbols, or any combination thereof). As portrayed in the GUI (200), the static policy text box (214) may be positioned to the left of the policy selection menu (212) and, accordingly, may contain a character string (e.g., "Protection Policy:") disclosing that which choices of the policy selection menu (212) may represent. Moreover, a user may not interact with the static policy text box (214).

In one embodiment of the invention, the GUI (200) may include an editable period text box (216). The editable period text box (216) may represent a user-editable text field, which contains and displays a dynamic character string (e.g., a sequence of letters, numbers, symbols, or any combination thereof). When interacted with by the user, the editable period text box (216) may display a keyboard cursor, thereby indicating and permitting the user to modify the dynamic character string contained and displayed by the editable period text box (216).

In one embodiment of the invention, the GUI (200) may include a period unit selection menu (218). When interacted with by a user, the period unit selection menu (218) may expand to display a list of protection period unit labels, which may map to a list of protection period units, respectively, that may provide context to the character string contained and displayed in the editable period text box (216). Further, following a user selection from the aforementioned list of protection period unit labels, the period unit selection menu (218) may collapse, thereby displaying only a selected protection period unit label (e.g., "Days") mapped to a given protection period unit. Moreover, each time a different user selection transpires from the list of protection period unit labels, at least a subset of the various user interface objects (e.g., the backup asset matrix (206)) may change to disclose information indicating whether asset protection threats have been detected, for a set of backup assets mapped to the given live service, based on the character string contained/displayed in the editable period text box (216) and the selected protection period unit label displayed in the period unit selection menu (218).

In one embodiment of the invention, the GUI (200) may include a static period text box (220). The static period text box (220) may represent a static text field, which contains and displays a pre-determined character string (e.g., a sequence of letters, numbers, symbols, or any combination thereof). As portrayed in the GUI (200), the static period text box (220) may be positioned to the left of the editable period text box (216) and, accordingly, may contain a character string (e.g., "Protection Period:") disclosing that which the character string of the editable period text box (216) and the choices of the period unit selection menu (218) may represent. Moreover, a user may not interact with the static period text box (220).

While FIG. 2 shows a configuration of user interface objects, other GUI (200) configurations may be used without departing from the scope of the invention. For example, additional or alternative user interface objects (not shown) may populate the GUI (200), and information presented by way of the GUI (200) may be disclosed using alternate schema.

Figure 3:
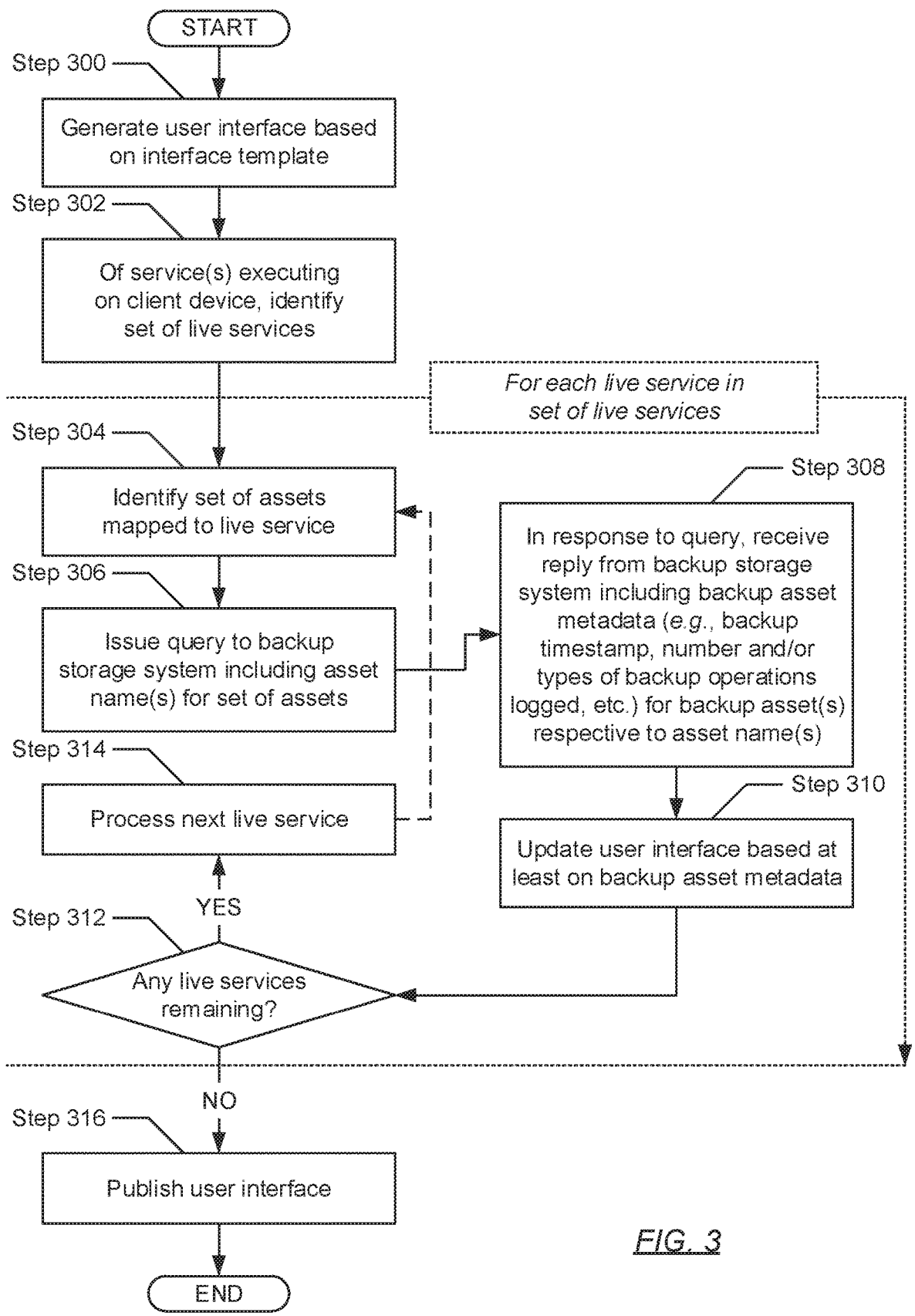
FIG. 3 shows a flowchart describing a method for publishing a user interface in accordance with one or more embodiments of the invention.

FIG. 3 shows a flowchart describing a method for publishing a user interface in accordance with one or more embodiments of the invention. The various steps outlined below may be performed by the protection agent on a client device (see e.g., FIG. 1B). Further, while the various steps in the flowchart are presented and described sequentially, one of ordinary skill will appreciate that some or all steps may be executed in different orders, may be combined or omitted, and some or all steps may be executed in parallel.

Turning to FIG. 3, in Step 300, a user interface is generated. In one embodiment of the invention, the user interface may represent a collection of interactive graphical icons (also referred to as user interface objects). Integrally, the user interface may serve to present detected asset protection threats to users and, accordingly, facilitate user mitigation of the detected asset protection threats. An asset protection threat may refer to any detectable condition (e.g., a time span elapsed since a last backup timestamp, for a last backup operation targeting an asset, exceeding a threshold time period) likely to cause an asset, maintained on the client device, to lack sufficient disaster recovery protection. Further, the user interface may be generated based on an interface template, or a pre-formatted, metadata unpopulated user interface layout.

In Step 302, of the one or more services residing on the client device, a set of live services is identified. In one embodiment of the invention, a live service may represent any service for which there is at least one instance of the service that is executing. For example, to determine whether a given database is a live service, the following command may be executed ("run the command ps-ef|grep pmon) and if there is no response then the database may be consider to not be a live service. The invention is not limited to this example.

Hereinafter, a subset of the remaining steps (e.g., Steps 304 through 314) may be performed iteratively for each live service (identified in Step 302). That is, for example, if three live services had been identified in the aforementioned step, a first traversal of the aforementioned remaining steps subset may transpire for a first identified live service, a second traversal of the aforementioned remaining steps subset may transpire for a second identified live service, and a third traversal of the aforementioned remaining steps subset may transpire for a third identified live service, before the process may proceed to the final step (i.e., Step 316). Furthermore, during each iterative traversal, the term "given live service" may be used to reference an identified live service (e.g., the first identified live service, the second identified live service, the third identified live service, and so forth) currently being considered/processed during the instant iterative traversal.

Accordingly, in view of the above, in Step 304, a set of one or more assets is identified. In one embodiment of the invention, the set of assets may map, and therefore may belong, to the given live service. That is, the given live service may be responsible for managing the set of assets.

In Step 306, a query is issued to the backup storage system. In one embodiment of the invention, the query may pertain to ascertaining backup asset metadata (described below) corresponding to the set of assets (identified in Step 304). Further, the query may include one or more asset names assigned to, and therefore may uniquely identifying, the set of assets.

In Step 308, in response to the query (issued in Step 306), a reply is received from the backup storage system. In one embodiment of the invention, the reply may include the above-mentioned sought backup asset metadata, which may encompass information describing one or more backup assets (see e.g., FIG. 1C) mapped to the asset name(s) submitted with the query. Recall that a backup asset may represent one or more backup copies of an asset at varying given points-in-time, which may be consolidated on the backup storage system for data backup, archiving, and/or disaster recovery protection. Therefore, substantively, the backup asset metadata, descriptive of a given backup asset, may disclose backup operation information detailing one or more backup operations during which the backup copy(ies) of the asset had been generated and consolidated, respectively.

By way of examples, backup asset metadata, descriptive of a given backup asset, may include any subset of, but is not limited to, the following information: one or more backup operation timestamps encoding a date and/or time indicating a completion time for one or more backup operations, respectively, targeting a given asset corresponding to the given backup asset; a cardinality of backup operations enumerating the completed backup operation(s), which had targeted the given asset; a log of backup operation types (e.g., a full backup operation, an incremental backup operation, a differential backup operation, etc.) associated with the completed backup operation(s), which had targeted the given asset; backup time, backup size, backup file names, backup location, etc.

In Step 310, the user interface (generated in Step 300) is updated at least based on the backup asset metadata (received in Step 308). That is, in one embodiment of the invention, properties of one or more user interface objects, exhibited in the user interface, may be modified using at least a portion of the backup asset metadata. Further, by modifying the properties of a given user interface object, an appearance and/or information disclosed by the given user interface object may change.

To visualize the aforementioned step, consider the following non-limiting scenario denoting changes to one or more user interface objects, exhibited in the exemplary graphical user interface (GUI) shown in FIG. 2, at least based on received backup asset metadata. For the example, assume the received backup asset metadata includes a set of last backup operation timestamps encoding a date and/or time marking the completion of a set of last backup operations targeting the set of assets (identified in Step 304), respectively. Further, for brevity, changes described in the example, with respect to the exemplary GUI, may be restricted to a single, identified live service.

Subsequently, having received the aforementioned backup asset metadata (i.e., the set of last backup operation timestamps), updating of the exemplary GUI may include: identifying a first user interface object (e.g., an editable period text box) interacted with by the user, which may exhibit a period numerical value provided by the user; accessing a first set of properties configured for the first user interface object; identifying a first selective property (e.g., "BoxValue") from the first set of properties; retrieving a first current property value (e.g., "3") associated with the first selective property; identifying a second user interface object (e.g., a period unit selection menu) interacted with by the user, which may exhibit a period unit selection opted by the user; accessing a second set of properties configured for the second user interface object; identifying a second selective property (e.g., "UnitLabel") from the second set of properties; retrieving a second current property value (e.g., "Days") associated with the second selective property; and for each unit (e.g., each backup asset matrix element) of a third user interface object (e.g., a backup asset matrix): accessing a third set of properties configured for the third user interface object unit; identifying a third selective property (e.g., "ElementValue") from the third set of properties; assigning, to the third selective property, a third current property value denoted by a given last backup operation timestamp, of the set of last backup operation timestamps (i.e., the received backup asset metadata), respective to the third user interface object unit; obtaining a current timestamp encoding a present date and/or time; calculating a default unit unprotected period value from a difference between the given last backup operation timestamp and the current timestamp, which may be expressed in a default time unit (e.g., seconds); converting the default unit unprotected period value to a selected unit unprotected period value using, and expressed in, the second current property value; selecting, from a pair of pre-determined visual indicator names each associated with a respective pre-determined visual indicator (e.g., an "X" mark or a check mark): a first visual indicator name for a first visual indicator (e.g., the "X" mark) if the selected unit unprotected period value is greater than or equal to a numerical typecast of the first current property value, or alternatively, a second visual indicator name for a second visual indicator (e.g., the check mark) if the selected unit unprotected period value is less than the numerical typecast of the first current property value; re-accessing the third set of properties configured for the third user interface object unit; identifying a fourth selective property (e.g., "ElementMarker") from the third set of properties; and assigning, to the fourth selective property, a fourth current property value denoted by either the aforementioned first visual indicator name or second visual indicator name.

Returning to the outlined method, in Step 312, a determination is made as to whether any additional live services (identified in Step 302) remain to be considered/processed. Accordingly, in one embodiment of the invention, if it is determined that at least one more identified live service remains to be considered/processed, then the process proceeds to Step 314. On the other hand, in another embodiment of the invention, if it is alternatively determined that no more identified live services remain to be considered/processed, then the process alternatively proceeds to Step 316.

In Step 314, upon determining (in Step 312) that at least one more live service (identified in Step 302) remains to be considered/processed, a next identified live service is processed. In one embodiment of the invention, processing of the next identified live service may entail forwarding the process to Step 304, where identifying of a set of assets, mapped to the next identified live service, may be performed.

In Step 316, upon alternatively determining (in Step 312) that no more live services (identified in Step 302) remain to be considered/processed, the user interface (generated in Step 300 and updated iteratively in Step 310) is published. That is, in one embodiment of the invention, in publishing the user interface, the user interface may be made visible, accessible, and/or capable of being interacted with users of the client device.

Figure 4:
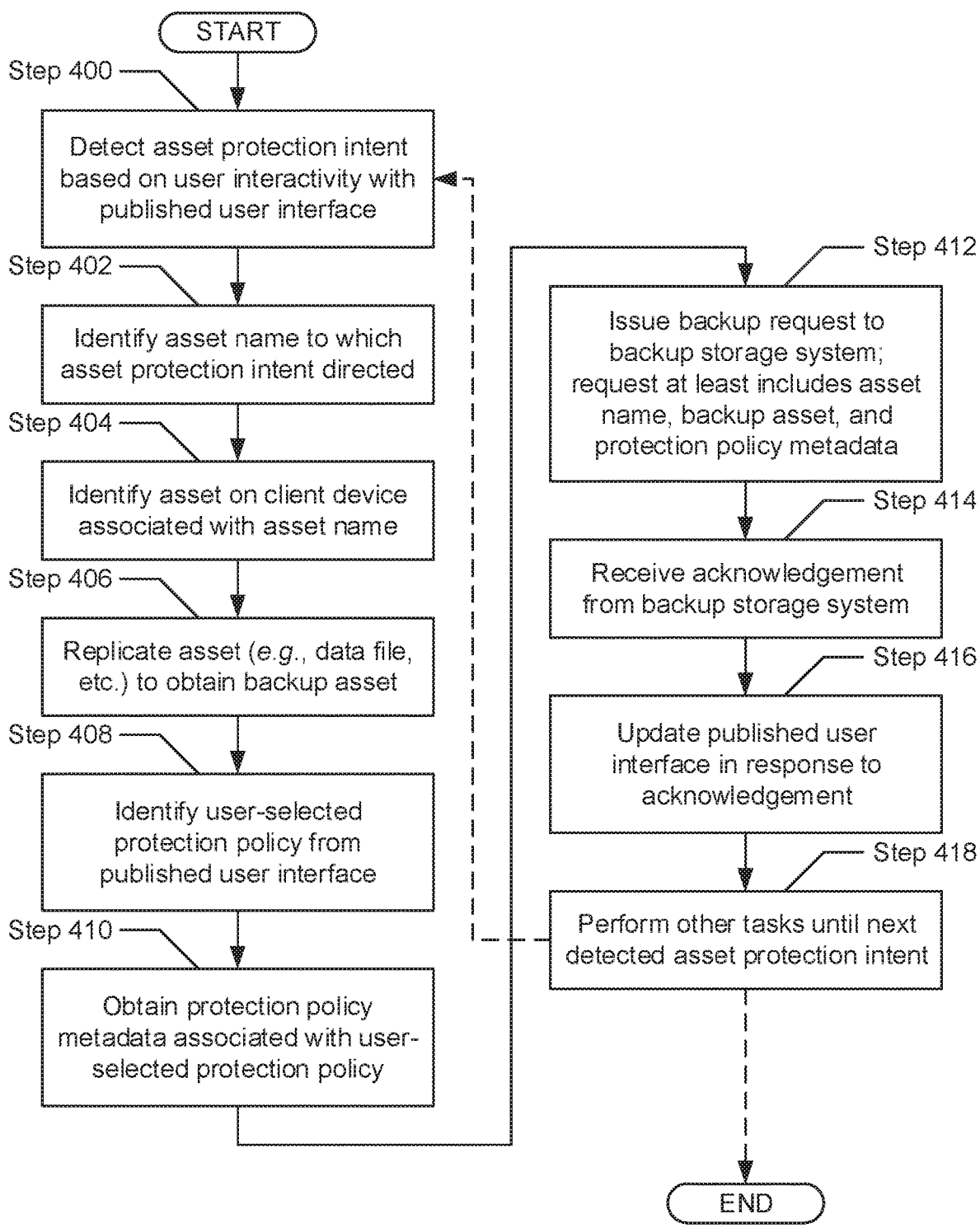
FIG. 4 shows a flowchart describing a method for mitigating asset protection threats in accordance with one or more embodiments of the invention.

FIG. 4 shows a flowchart describing a method for mitigating asset protection threats in accordance with one or more embodiments of the invention. The various steps outlined below may be performed by the protection agent on a client device (see e.g., FIG. 1B). Further, while the various steps in the flowchart are presented and described sequentially, one of ordinary skill will appreciate that some or all steps may be executed in different orders, may be combined or omitted, and some or all steps may be executed in parallel.

Turning to FIG. 4, in Step 400, an asset protection intent is detected. In one embodiment of the invention, the asset protection intent may manifest as a certain user interaction with a published user interface. Further, the asset protection intent may refer to a user-driven action that may reflect a user's intention (or desire) to mitigate a detected asset protection threat concerning a given asset belonging to a given service residing on the client device. Mitigation of the detected asset protection threat may entail performing an on-demand backup operation targeting the given asset of the given service.

Furthermore, by way of an example, in view of the exemplary graphical user interface (GUI) illustrated in FIG. 2, the asset protection intent may take form as a drag-and-drop action, by a user, of an asset matrix element (representative of the given asset belonging to the given service) from an asset matrix to a backup asset matrix. Aside from identifying the given asset as the target of the aforementioned on-demand backup operation, a protection policy selected by the user, through interaction with a policy selection menu on the exemplary GUI, may close out the minimal requirements for configuring and executing the on-demand backup operation.

In Step 402, an asset name for the given asset, to which the asset protection intent (detected in Step 400) may be directed, is identified. In one embodiment of the invention, the asset name of an asset may refer to a character string (e.g., a sequence of letters, numbers, symbols, or any combination thereof) that may uniquely identify the asset. Furthermore, at least with respect to the exemplary GUI illustrated in FIG. 2, the asset name may be discerned by: identifying the user interface object (i.e., an asset matrix element) interacted with by the user, which had been associated with the asset protection intent (i.e., drag-and-drop action); accessing a set of properties configured for the user interface object; identifying a selective property (e.g., "AssetName") of the set of properties; and retrieving a current property value (e.g., "A07") associated with the selective property.

In Step 404, the given asset, physically maintained on the client device, is identified using the asset name (identified in Step 402). In Step 406, the given asset (identified in Step 404) is replicated. Specifically, in one embodiment of the invention, a granularity of the various database objects (e.g., one or more data files, control files, and/or redo log files), of the given asset, may be replicated. Further, following replication, a backup asset (or backup copy) of the given asset for a current point-in-time may be obtained.

In Step 408, a protection policy is identified. In one embodiment of the invention, the protection policy may refer to a pre-defined schema outlining a given backup strategy for safeguarding the given asset. Further, at least with respect to the exemplary GUI illustrated in FIG. 2, the protection policy may be discerned by: identifying a user interface object (i.e., a policy selection menu) interacted with by the user prior to the asset protection intent (i.e., drag-and-drop action), which may exhibit a policy selection opted by the user; accessing a set of properties configured for the user interface object; identifying a selective property (e.g., "PolicyName") of the set of properties; and retrieving a current property value (e.g., "Policy2") associated with the selective property.

In Step 410, protection policy metadata, associated with the protection policy (identified in Step 408), is obtained. In one embodiment of the invention, protection policy metadata may refer to information outlining the parameters through which the protection policy may be defined and applied. Examples of protection policy metadata may include, but are not limited to, a data retention length specifying a span of time during which the backup asset (obtained in Step 406) should be retained in the backup storage system; legal requirements for data protection, location of the protected data (e.g., hot or cold storage), role of the custodian of data, and scope of data protection.

Furthermore, by way of an example and in view of the exemplary GUI illustrated in FIG. 2, obtaining the aforementioned protection policy metadata, having retrieved a policy name (e.g., "Policy2") of the protection policy, may entail: performing a lookup on a selective partition (e.g., a protection policy directory) of a client storage array on the client device using the policy name; discovering a data object or logical container (e.g., a data file, a data structure, or a composite data variable), maintained therein, identifiable by the policy name and enclosing the protection policy metadata; and retrieving, from the selective partition of the client storage array, the discovered data object or logical container.

In Step 412, a backup request is issued. In one embodiment of the invention, the backup request may be directed to the backup storage system, and may pertain to completing the backup operation (initiated in Step 406) targeting the given asset (identified in Step 404). At the backup storage system, completion of the backup operation may entail storing the asset data submitted with the backup request based in accordance with user-specified instructions. Accordingly, the backup request may include the asset name (identified in Step 402), the backup asset (obtained in Step 406), and the protection policy metadata (obtained in Step 410).

In Step 414, in response to the backup request (issued in Step 412), an acknowledgement is received from the backup storage system. In one embodiment of the invention, the acknowledgement may represent a message verifying that completion of the backup operation (i.e., consolidation of the backup asset in a backup storage array of the backup storage system) has been achieved.

In Step 416, the published user interface is updated based on the acknowledgement (received in Step 414). That is, in one embodiment of the invention, properties of one or more user interface objects, exhibited in the published user interface, may be modified in response to receiving the acknowledgement. Further, by modifying the properties of a given user interface object, an appearance and/or information disclosed by the given user interface object may change.

For example, when considering the exemplary GUI illustrated in FIG. 2, updating of the published user interface based on the acknowledgement may entail: identifying a unit (e.g., a backup asset matrix element) of a user interface object (e.g., a backup asset matrix), where the identified unit maps to the backup asset with which the acknowledgment may be associated; accessing a set of properties configured for the user interface object; identifying a selective property (e.g., "ElementMarker") from the set of properties; and replacing a current property value, denoted by a first visual indicator name respective to a first visual indicator (e.g., an "X" mark), with a second visual indicator name respective to a second visual indicator (e.g., a check mark).

In Step 418, other tasks (for which the protection agent on the client device may be responsible) are performed until a next asset protection intent is detected (see e.g., Step 400).

Figure 5:
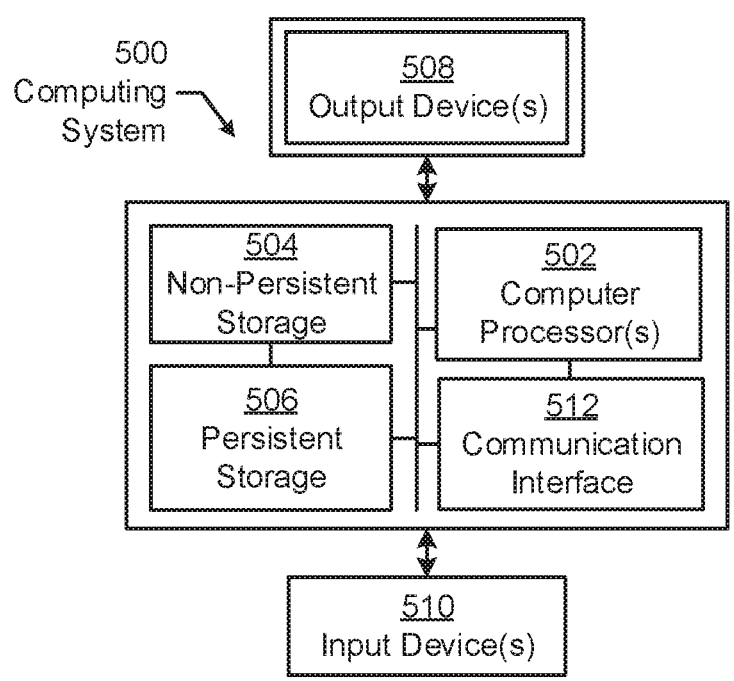
FIG. 5 shows an exemplary computing system in accordance with one or more embodiments of the invention.

FIG. 5 shows an exemplary computing system in accordance with one or more embodiments of the invention. The computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a central processing unit (CPU) and/or a graphics processing unit (GPU). The computing system (500) may also include one or more input devices (510), such as a touchscreen, keyboard, mouse, microphone, touchpad, electronic pen, or any other type of input device. Further, the communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

In one embodiment of the invention, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for mitigating asset protection threats, comprising:
    initializing a user interface comprising an asset matrix of asset matrix elements and a backup asset matrix of backup asset matrix elements;
    identifying a live service from a set of services;
    issuing, to a backup storage system, a first query comprising a first set of asset names associated with a first set of assets of the asset matrix mapped to the live service;
    receiving, in response to the first query and from the backup storage system, first backup asset metadata for a first set of backup assets mapped to the first set of asset names;
    updating the backup asset matrix based on at least a portion of the first backup asset metadata;
    publishing the user interface to obtain a published user interface;
    detecting an asset protection intent based on user interaction with the published user interface, wherein the published user interface comprises:
        the asset matrix of asset matrix elements, each of the asset matrix elements being a user interface object associated with an asset belonging to the live service, and
        the backup asset matrix of backup asset matrix elements, each of the backup asset matrix elements being a user interface object associated with a backup asset belonging to the live service;
    identifying the asset to which the asset protection intent is directed;
    initiating, in response to the detecting the asset protection intent, a backup operation targeting the asset to obtain a corresponding backup asset; and
    issuing, to a backup storage system, a backup request comprising the corresponding backup asset.

2. The method of claim 1, wherein the asset protection intent reflects user intention to mitigate an asset protection threat detected for the asset, wherein the asset protection threat is exhibited using at least one user interface object of the backup asset matrix of the published user interface.

3. The method of claim 1, wherein the asset represents a database managed by a service executing on a client device operatively connected to the backup storage system.

4. The method of claim 3, wherein the service represents a database management system instance.

5. The method of claim 1, wherein the corresponding backup asset comprises a replication of at least a granularity of the asset for a current point-in-time.

6. The method of claim 1, further comprising: prior to issuing the backup request:
identifying a protection policy based on user selection from a plurality of protection policies exhibited on the published user interface; and
obtaining protection policy metadata associated with the protection policy,
wherein the backup request further comprises the protection policy metadata.

7. The method of claim 1, further comprising:
receiving, in response to the backup request, an acknowledgement from the backup storage system; and
updating, based on the acknowledgment, at least a portion of the published user interface.

8. The method of claim 7, wherein updating the at least portion of the published user interface, comprises:
modifying at least one property of at least one user interface object of the backup asset matrix of the published user interface in response to the acknowledgement,
wherein by modifying the at least one property of the at least one user interface object, at least one selected from a group consisting of an appearance of the at least one user interface object and information disclosed by the at least one user interface object, is changed to remove an exhibition of an asset protection threat on the backup asset matrix of the published user interface,
wherein the asset protection threat had been detected for the asset.

9. The method of claim 1, wherein the first backup asset metadata comprises a last backup operation timestamp encoding a date and time marking a completion of a last backup operation targeting the first set of assets.

10. The method of claim 9, wherein updating the backup asset matrix, comprises:
modifying at least one property of at least a first portion of user interface objects of the backup asset matrix based at least on the last backup operation timestamp,
wherein by modifying the at least one property of the at least first portion of the plurality of user interface objects, at least one selected from a group consisting of an appearance of the at least first portion of the plurality of user interface objects and information disclosed by the at least first portion of the plurality of user interface objects, is changed to exhibit a detected asset protection threat on the user interface,
wherein the detected asset protection threat is directed to the asset.

11. The method of claim 1, further comprising:
prior to publishing the user interface:
identifying a second live service from the set of services;
issuing, to the backup storage system, a second query comprising a second set of asset names of the asset matrix associated with a second set of assets mapped to the second live service;
receiving, in response to the second query and from the backup storage system, second backup asset metadata for a second set of backup assets mapped to the second set of asset names; and
updating the user interface objects of the backup asset matrix based on at least a portion of the second backup asset metadata.

12. A non-transitory computer readable medium (CRM) comprising computer readable program code, which when executed by a computer processor, enables the computer processor to:
initiate a user interface comprising an asset matrix of asset matrix elements and a backup asset matrix of backup asset matrix elements;
identify a live service from a set of services;
issue, to a backup storage system, a first query comprising a first set of asset names associated with a first set of assets of the asset matrix mapped to the live service;
receive, in response to the first query and from the backup storage system, first backup asset metadata for a first set of backup assets mapped to the first set of asset names;
update the backup asset matrix based on at least a portion of the first backup asset metadata;
publish the user interface to obtain a published user interface;
detect an asset protection intent based on user interaction with the published user interface, wherein the published user interface comprises:
the asset matrix of asset matrix elements, each of the asset matrix elements being a user interface object associated with an asset belonging to the live service, and
the backup asset matrix of backup asset matrix elements, each of the backup asset matrix elements being a user interface object associated with a backup asset belonging to the live service;
identify the asset to which the asset protection intent is directed;
initiate, in response to the detecting the asset protection intent, a backup operation targeting the asset to obtain a corresponding backup asset; and
issue, to a backup storage system, a backup request comprising the corresponding backup asset.

13. The non-transitory CRM of claim 12, wherein the asset protection intent reflects user intention to mitigate an asset protection threat detected for the asset, wherein the asset protection threat is exhibited using at least one user interface object of the backup asset matrix of the published user interface.

14. The non-transitory CRM of claim 12, comprising computer readable program code, which when executed by the computer processor, further enables the computer processor to:
prior to issuing the backup request:
identify a protection policy based on user selection from a plurality of protection policies exhibited on the published user interface; and
obtain protection policy metadata associated with the protection policy,
wherein the backup request further comprises the protection policy metadata.

15. The non-transitory CRM of claim 12, comprising computer readable program code, which when executed by the computer processor, further enables the computer processor to:
receive, in response to the backup request, an acknowledgement from the backup storage system; and
update, based on the acknowledgment, at least a portion of the published user interface.

16. The non-transitory CRM of claim 15, comprising computer readable program code directed to updating the at least portion of the published user interface, which when executed by the computer processor, further enables the computer processor to:

modify at least one property of at least one user interface object of the backup asset matrix of the published user interface in response to the acknowledgement, wherein by modifying the at least one property of the at least one user interface object, at least one selected from a group consisting of an appearance of the at least one user interface object and information disclosed by the at least one user interface object, is changed to remove an exhibition of an asset protection threat on the backup asset matrix of the published user interface, wherein the asset protection threat had been detected for the asset.

17. The non-transitory CRM of claim 12, wherein the first backup asset metadata comprises a last backup operation timestamp encoding a date and time indicating a completion of a last backup operation targeting the first set of assets.

18. The non-transitory CRM of claim 17, comprising computer readable program code directed to updating the backup asset matrix, which when executed by the computer processor, further enables the computer processor to:

modify at least one property of at least a first portion of the user interface objects of the backup asset matrix based at least on the last backup operation timestamp, wherein by modifying the at least one property of the at least first portion of the plurality of user interface objects, at least one selected from a group consisting of an appearance of the at least first portion of the plurality of user interface objects and information disclosed by the at least first portion of the plurality of user interface objects, is changed to exhibit a detected asset protection threat on the user interface, wherein the detected asset protection threat is directed to the asset.

\* \* \* \* \*